(No Model.)
E. FOERSTER.
STONE CUTTING SAW.
No. 462,482. Patented Nov. 3, 1891.
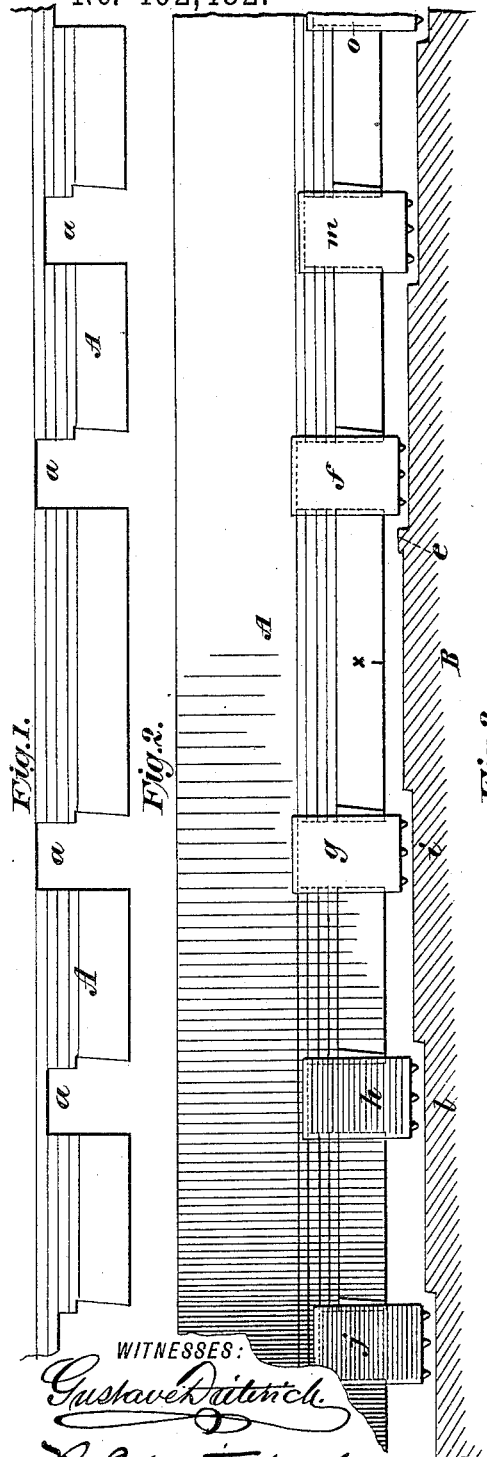
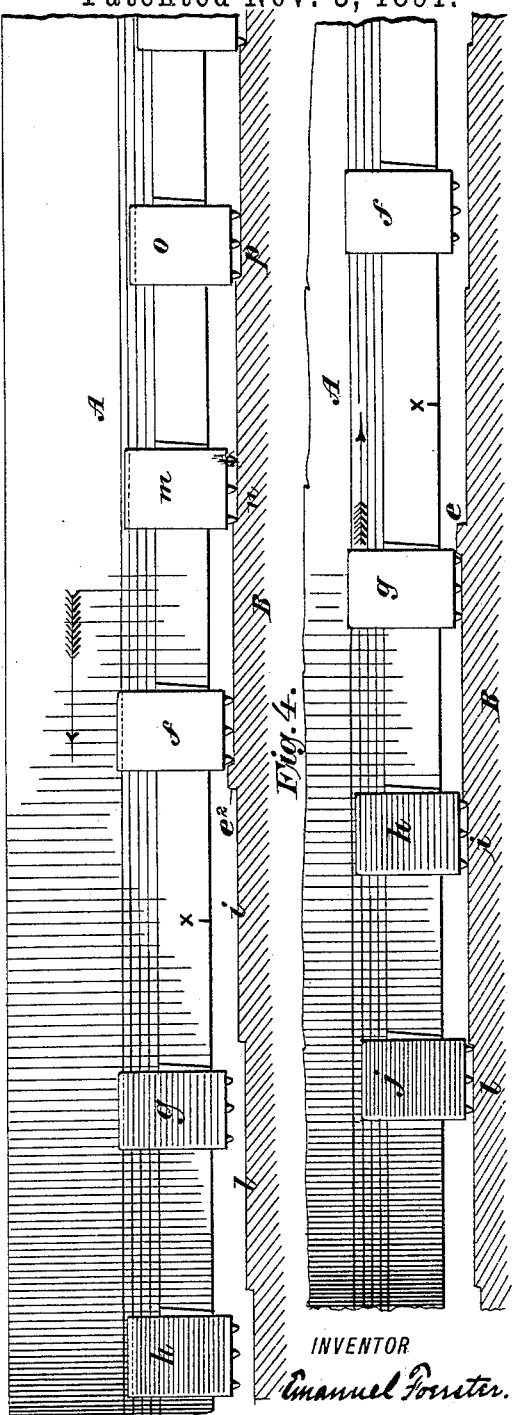
WITNESSES:
Gustave Dittrich
R. C. Mitchell
INVENTOR
Emanuel Foerster.
BY Briesen & Knauth
his ATTORNEYS

UNITED STATES PATENT OFFICE.

EMANUEL FOERSTER, OF NEW YORK, N. Y.

STONE-CUTTING SAW.

SPECIFICATION forming part of Letters Patent No. 462,482, dated November 3, 1891.

Application filed January 26, 1891. Serial No. 379,063. (No model.)

*To all whom it may concern:*

Be it known that I, EMANUEL FOERSTER, a resident of the city, county, and State of New York, have invented a new and useful Improvement in Stone-Cutting Saws, of which the following is a full and clear specification.

My invention relates to a class of stone-cutting saws known as "diamond saws;" and it consists in providing a saw-blade or cutter-holder with a step-by-step series of recesses for holding the diamond cutters, as hereinafter described.

My invention is illustrated in the accompanying drawings, in which—
Figure 1 is a side elevation of part of my saw-band, minus the diamond cutters. Fig. 2 is a side elevation of part of my saw-band with the diamond cutters in place, showing it in one of its positions over a stone. Fig. 3 is a similar view of the same in another position, and Fig. 4 a similar view of the same in still another position.

Similar letters refer to similar parts.

A is a saw-blade, in which recesses $a\ a$ are cut or formed to hold and retain the cutters, Figs. 2, 3, and 4. These recesses are of varying depth, as shown, to hold the cutters at different heights. The recesses decrease in height step by step from the center of the saw-blade, if a double saw is used, as in the drawings, thus producing a step-by-step cut in the stone. The spaces between all the cutters are by preference equal, with the exception of the middle space, which should preferably be larger than the others.

In operating my device the saw is hung in a suitable sash, to which the ordinary backward-and-forward motion is imparted, and by which both ends of the saw may be fed downward evenly and simultaneously. For the sake of illustration, we will assume a stone twelve feet broad is to be operated on. The outer cutters of the saw-blade should be, say, a trifle over thirteen feet apart, and the distance between the remaining cutters should be, say, one foot, giving at the center a distance of a little over a foot between the central cutters $fg$. This saw should have a swing of more than one foot. These figures in view, it will be easy to follow the working of my saw. One of the outermost cutters, (say the left-hand one,) which is lower than the others of the same series, owing to the depth of its recess, now advances from its side toward the block of the stone until the diamond reaches the edge of the stone, and, continuing, cuts a groove in the stone to a distance determined by the length of the remainder of the stroke. The saw then advances in the opposite direction. After the left-hand cutter retreats beyond the edge of the stone the right-hand cutter will contact with the right-hand edge of the stone and cut for a distance equivalent to the cut made by the left-hand cutter. The saw then reverses again, and when the right-hand cutter retreats over the right-hand edge of the stone the saw is lowered and the left-hand cutter again contacts and deepens the groove on its side, when the blade is again reversed and the right-hand cutter takes hold, and so on. As the operation continues and the saw is lowered, the inner set of cutters next to the outer begins to alternately cut steps into the stone, in the same manner that the two outer cutters did. This operation continues until the next inner set of cutters contacts with the stone, and so on, until all the cutters in both sets alternately cut into the stone in the manner above described.

I have taken the above distances between the cutters merely to facilitate the description; but it is obvious that the distances between the cutters in each and the distance of the space between each set at the center may be changed.

In Figs. 2, 3, and 4 a nub $e$ ($e^2$) is shown near the center of the stone B. The stroke of the saw is preferably regulated so as to leave such a nub, which can easily be taken off by the next cutter on the opposite stroke.

In Fig. 4 the saw is supposed to have finished the stroke to the right, as indicated by the arrow on that figure. The two central cutters $f$ and $g$ are in this figure shown, the one $g$ to abut against the nub $e$, which remains at the end of this right-hand stroke; the other $f$ raised off the stone. The cutter $h$ to the left of $g$ has cut its step $i$, the next cutter $j$ its step $l$, and so forth. After the stroke to the right has been thus completed the saw-blade is moved to the left until the position shown in Fig. 2 is attained, in which position the cutter $g$ is above the step $i$, the cutter $h$ above the step $l$, and so forth, while the cutter $f$ is near to and on the right of the nub $e$. At this stage the saw-blade can be lowered, and then its stroke to the left until the position shown in Fig. 3 is attained. During this stroke to the left the cutter $f$ took off the nub $e$ of Figs. 2 and 4 and produced a new nub $e^2$, the cutter $m$ producing the step $n$, the cutter $o$ the step $p$, and so forth. The saw-blade is then again moved to the right, lowered and continued to the right, and so forth, until the work is completed. It will be seen that during this action each cutter finds in the way of its path a substantially perpendicular wall of stone, which it removes, and that consequently the sawing action no longer depends upon pressure from above, as heretofore.

I have described the blade as a double blade with two sets of step-by-step recesses and corresponding cutters $g\ h\ j$ and $f\ m\ o$; but it is evident that a blade having but one set of such step-by-step recesses and cutters may also be usefully employed in accordance with my invention. I do not limit myself to any particular number of cutters.

In the drawings the central recesses and their cutters $f$ and $g$ are shown to be on a higher plane than the cutters $m$ and $h$, these again on a higher plane than $o$ and $j$, and so on.

I do not broadly claim a saw having teeth projecting at varying distances from its edge, as I know that this is old; but a diamond saw having recesses of varying depths in its edge to receive the diamond cutters and to hold the same at varying distances has not, as I believe, previously been made.

Having now described my invention, what I claim is—

A saw-blade provided with recesses extending into its edge to varying depths, combined with diamond cutters of equal length throughout, which are set into the recesses of varying depths, so that said cutters project from said blade to varying distances by abutting against the inner edges of the recesses, substantially as herein shown and described.

EMANUEL FOERSTER.

Witnesses:
HARRY M. TURK,
R. C. MITCHELL.